3,151,090
FREEZE RESISTANT LATEX
Ralph E. McNay and William R. Peterson, Baytown, Tex., assignors, by mesne assignments, to Ashland Oil & Refining Company, Ashland, Ky., a corporation of Kentucky
No Drawing. Filed May 11, 1960, Ser. No. 28,203
6 Claims. (Cl. 260—27)

This invention relates to paint latexes and water dispersion paint compositions containing such paint latexes. More particularly, it relates to a method of enhancing the freeze stability of such latexes and paint compositions and to the freeze stable compositions resulting therefrom.

In recent years, water dispersion paint compositions in which synthetic latexes prepared by emulsion polymerization are employed as binders have become widely accepted for both inside and outside applications. The advantages in application as well as the desirable characteristics of the resultant coatings or films are well recognized both within and without the paint manufacturing industry. Unfortunately, however, such paint compositions are also plagued by certain disadvantages not the least of which is their general inability to withstand reduced temperatures ranging from freezing to considerably below freezing. Under such temperature conditions, thickening or coagulation occurs rendering the compositions useless for coating purposes. An obvious but impractical solution to the problem is to maintain the temperature of such compositions above the freezing point. Both the latex and paint manufacturers, therefore, have been confronted with the necessity of improving the freeze resistance or freeze stability of paint latexes and paint compositions to an extent sufficient for such products to withstand naturally and frequently occurring low temperatures without detriment.

To this end, certain proposals have been made for improving this freeze resistance or freeze stability which have been employed with varying degrees of success. One such proposal involves any of various special techniques of polymerization whereby latexes are produced which are inherently more freeze resistant. Such techniques, of course, involve exceptionally close operational control which, as a practical matter, may not be possible to the extent necessary to continuously produce latexes of constant freeze resistant quality. A more practical and successful way of combatting the problem is by incorporating in the latex or paint a material found to impart freeze resistance thereto. Certain of such materials have proved to be exceptionally good freeze stabilizing agents and have received wide commercial acceptance. Still others, however, have not been completely satisfactory because they do not provide adequate protection at lower temperatures, or may provide protection to the paint latex, per se, but not the paint composition or for any of various other reasons.

The present invention is concerned with the second means of stabilization, i.e., by the addition of a stabilizing agent or additive, a demand for improved versions of which continues to exist. It is a principal object of this invention, therefore, to meet this demand. It is a further object of this invention to provide an improved agent which is economical, readily available, constant in quality and non-detrimental to water dispersion paint compositions in which it is incorporated. It is a still further object of this invention to provide a method for enhancing the freeze stability of paint latexes as well as the water dispersion paint compositions prepared therefrom. It is an additional object of this invention to provide a freeze stabilizing agent which is effective over the entire range of below freezing temperatures normally encountered where such latexes and paint compositions are usually employed. Another object of this invention is to provide a freeze stable water dispersion paint composition comprising a synthetic latex as the principal binder.

These objects have been met in a particularly surprising and effective manner. In accordance with this invention, it has been found that the freeze resistance or freeze stability of paint latexes and water dispersion paint compositions prepared therefrom is unusually enhanced by incorporating therein a small amount of a freeze stabilizing substance derived from the plant Grindelia. More particularly, this unusual freeze stabilizing substance is an extract of the plant Grindelia which is soluble in alcohol but insoluble in hydrocarbon solvents.

The plant Grindelia from which the freeze stabilizing agent of this invention is derived belongs to the tribe Asteroideae of the natural family Compositae. The genus Grindelia includes some 25 species, six or eight of which are found in South America. The remainder occur in the United States mostly west of the Mississippi River, generally in semi-arid plateau regions. A particular prevalent plant in the United States is the specie *G. squarrosa*, commonly referred to as "curly cup gumweed." Other well known species are *G. humilis*, "marsh gumweed," *G. camporum*, "field gumweed," *G. robusta* and a South American variety *G. discoidea*. The various species are perennial or biennial and produce a sticky resinous substance on the stem and leaves especially on the flower heads from which characteristic is derived the common name "gum plant" or "gum weed." Certain extracts of the plant have been shown to exhibit some utility in certain areas of the pharmaceutical field, but beyond this there has apparently been no further investigation of the plant for any purpose.

The freeze stabilizing agent employed according to the present invention is obtained from the plant Grindelia by conventional extraction means. Thus, the finely pulverized plant including leaves, flower heads and stems is simply leached by percolating therethrough any common hydrocarbon solvent, such as VM&P naphtha. The pulverized plant is then subjected to extraction with alcohol, such as methanol, although higher alcohols such as ethyl and isopropyl may be employed. The extract is a soft, dark colored acidic resinous substance. This resinous substance, when employed in the form of a water soluble salt in either latexes or paint compositions imparts thereto exceptional freeze resistance characteristics.

A particularly surprising feature of this invention is that the extracted acidic resinous substance, when employed as such, exhibits freeze resistant properties that are not especially significant. On the other hand, it has been found that if the resinous substance is saponified to form a water soluble salt and employed in this form, unusual freeze resistant properties are exhibited. By water soluble salts as used herein in meant principally the alkali metal salts, particularly the sodium and potassium salts, including the ammonium salt. The salts of the resinous substance are readily prepared in a conventional manner by adding an aqeuous solution of the preferred hydroxide of any convenient concentration to an aqueous dispersion of the resinous substance. The resultant mixture is agitated at room temperature until solution is complete. When incorporated in a paint latex or paint composition, the aqueous salt solution may be used in varied concentrations but will generally be employed as a 10–25% aqueous solution.

The following example illustrates the extraction of the plant Grindelia and the saponification of the extract. All parts are by weight unless otherwise noted.

*Example 1*

1000 parts of the whole plant *G. squarrosa* is pulverized with a hammer mill and subjected to extraction by simple percolation at room temperature with 2000 parts of commercially available VM&P naphtha. After 30 minutes, the resultant slurry is filtered and the solid residue subjected to further extraction at room temperature with 2000 parts of methyl alcohol. After 30 minutes, the slurry is subjected to filtration and the filtrate distilled to remove the alcohol giving 105 parts of a resinous residue. 50 parts of the resinous residue are suspended in 200 parts of water, neutralized to a pH of 10–11 and agitated for 10 minutes. Additional water is then added to give a 15% solution.

The amount of freeze resistant agent employed in accordance with this invention may be quite widely varied. It has been found, for instance, that improved freeze resistance is imparted to paint latexes and paint compositions when using as little as about 0.5% by weight of the saponified resin based on the weight of the polymer content of the latex. This amount may be considerably increased to as much as about 15%, but the use of the agent in amounts much beyond 15% is not warranted as a practical matter since little added advantage is gained. The usual practice will be to employ about 4.0–8.0% by weight of the polymer content in which range unusually stable paint latexes and paint compositions are obtained.

Addition of the freeze resistant agent may be made at various stages in the preparation of the latex or in the preparation of the paint composition. Since it is effective in paint latex, per se, as well as in paints prepared therefrom, however, it is preferably incorporated in the latex at some stage in its preparation thereof so that full advantage of its unusual properties may be taken. Accordingly, the freeze resistant agent may be incorporated during emulsion polymerization or it may be added upon completion of polymerization. Alternatively, it may be added at any of various other points throughout the process of preparation such as prior to stripping of unreacted monomers. Preferably, however, the stabilizing agent is added to the latex after it has been stripped of unreacted monomers and is ready for storage and/or shipment.

Synthetic latexes to which this invention is applicable are any of those latexes suitable for paint compositions which are prepared by the aqueous emulsion polymerization of a polymerizable ethylenic compound either with itself or with one or more different polymerizable ethylenic compounds. Examples of such ethylenic compounds are conjugated diolefins such as butadiene-1,3, methyl-2-butadiene-1,3, chloro-2-butadiene-1,3, piperylene, 2,3-dimethyl butadiene-1,3 and the like; aryl olefins such as styrene, vinyl naphthlene, α-methylstyrene, p-chlorostyrene, vinyl toluene, divinyl benzene and the like; α-methylene carboxylic acids, their esters, nitriles and amides such as acrylic acid, methyl acrylate, methylmethacrylate, acrylonitrile, methacrylonitrile, acrylamide, methacrylamide and the like; vinyl aliphatic compounds such as the vinyl halides, vinyl acetate, methyl vinyl ether, methyl vinyl ketone and the like; and vinylidene compounds such as the vinylidene halides.

While the present invention is particularly directed to improving the freeze resistance of paint latexes as above described including paint compositions prepared therefrom, additional advantages are gained by the use of the freeze resistant agent described herein. Thus, films or coatings prepared from paint compositions stabilized according to this invention quite unexpectedly exhibit superior film clarity, significantly improved adhesion properties as well as a distinctly better resistance to water spotting than is found in films and coatings not so stabilized.

The following examples further illustrate the invention. In these examples, the test procedure comprises placing a sample of paint latex or a water paint composition in a covered metal container and then placing the container in a refrigerated compartment for 16 hours at the test temperature. After 16 hours, the container is removed and the frozen contents permitted to thaw at room temperature. When the contents reach room temperature, they are observed for coagulation and viscosity variation. The contents are then resubjected to the same procedure until coagulation occurs or until four cycles are completed. All parts are by weight unless otherwise noted, the weight of freeze resistant agent being based on the polymer content of the latex.

*Example 2*

A sample of a paint latex comprising 67 parts styrene and 33 parts butadiene is placed in a covered metal container and subjected to a temperature of −29° C. After 16 hours at this temperature, the frozen contents are thawed at room temperature. On completion of thawing, the contents are found to have increased considerably in viscosity and coagulated to such an extent as to be useless in the preparation of a paint composition.

*Example 3*

The procedure of Example 2 is repeated except that 4.0% by weight of the polymer content of the latex of the sodium salt of Example 1 is added to the latex as a 15% aqueous solution. The contents are then subjected to four cycles of freezing and thawing similar to the one cycle conducted in Example 2. On thawing after the fourth freezing, the thawed contents exhibit no detrimental coagulation or viscosity increase and may be employed in the preparation of a free flowing paint composition.

*Example 4*

The procedure of Example 2 is repeated using a sample of Dow 512R, a commercially available latex of the Dow Chemical Company, comprising 60 parts styrene and 40 parts butadiene. After the first freeze-thaw cycle, coagulation is so excessive as to render the latex useless for the preparation of a paint composition.

*Example 5*

The procedure of Example 4 is repeated except that 6.0% by weight of the polymer content of the latex of the product of Example 1 is added to the latex as a 15% aqueous solution. After four freeze-thaw cycles, no coagulation or change in viscosity is observed.

*Example 6*

The procedures of Examples 3 and 5 are repeated using as a freeze resistant agent the sodium salts of the resinous derivative of *G. camporum* and *G. robusta* extracted and saponified as in Example 1. Similar results are obtained.

*Example 7*

The procedure of Example 5 is repeated using the potassium salt prepared in the same manner as the sodium salt of Example 1. Similar results are observed.

*Example 8*

The procedure of Example 2 is repeated using a sample of Lytron 680, a commercially available styrene-acrylate latex of Monsanto Chemical Company. After one freeze-thaw cycle, coagulation is so excessive as to render the product useless.

*Example 9*

The procedure of Example 8 is repeated using 5.0% by weight of the polymer content of the latex of the salt of Example 1 added as a 15% aqueous solution. After four freeze-thaw cycles, no coagulation is observed and viscosity is substantially unchanged.

*Example 10*

The procedure of Example 2 is repeated using a sample of a styrene-butadiene acrylate latex comprising 40 parts styrene, 40 parts butadiene and 20 parts acrylate, the acrylate being a 50/50 mixture of ethyl acrylate and methyl methacrylate. After one freeze-thaw cycle, the latex is unusable because of excessive coagulation and increased viscosity.

*Example 11*

The procedure of Example 9 is repeated using 4.0% by weight of the polymer content of the latex of the sodium salt of Example 1 added as a 15% aqueous solution. After four freeze-thaw cycles, no coagulation is observed and viscosity is unchanged.

*Example 12*

The procedure of Example 2 is repeated using a sample of Elvacet 81-900, a commercially available polyvinyl acetate latex of E. I. du Pont. After one freeze-thaw cycle, the latex is completely coagulated.

*Example 13*

The procedure of Example 12 is repeated using 7.0% by weight of the polymer content of the latex of the product of Example 1 as a stabilizing agent. After four freeze-thaw cycles, no coagulation is observed and the viscosity is unchanged.

*Example 14*

The following ingredients are thoroughly mixed and passed through a colloid mill.

| Ingredient: | Parts |
| --- | --- |
| Rutile ($TiO_2$) | 100 |
| Lithopone | 100 |
| Mica | 25 |
| Clay | 75 |
| Tetrasodium pyrophosphate | 2 |
| Casein solution | 192 |
| Pine oil | 4 |
| Water | 112 |

To this thoroughly milled slurry is added 425 parts of a paint latex comprising 67 parts styrene and 33 parts butadiene to which has been added 4.0% by weight of the polymer content of the latex of the freeze stabilizing agent of Example 1 as a 15% solution of the sodium salt. Observation of the resultant paint composition after it has been subjected to four freeze-thaw cycles at −29° C. as in Example 3, reveals no coagulation or viscosity change. The paint flows freely and is readily applied to give well adhered coating exhibiting excellent clarity and resistance to water spotting.

*Example 15*

A paint composition is prepared according to Example 14 except that no freeze stabilizing additive is incorporated as in the composition. After one freeze-thaw cycle at −29° C. for 16 hours, the paint composition is coagulated and unusable.

The above examples illustrate the present invention in various of its aspects. It should be understood, however, that not only is it applicable to other paint latexes and paint compositions prepared therefrom, but the freeze resistant additive may be an extract of other species of the genus Grindelia in the form of other water soluble salts used in varying amounts and as aqueous solutions of varying concentrations.

We claim:

1. A freeze-stable latex comprising a synthetic polymer latex produced by emulsion polymerization and as a freeze-stabilizing agent about 0.5–15% by weight of the polymer content of the latex of a hydrocarbon insoluble-alcohol soluble extract of the plant Grindelia obtained by extracting said plant with a hydrocarbon and then extracting the resulting hydrocarbon insoluble residue with an alcohol, said hydrocarbon insoluble-alcohol soluble extract being in the form of a salt selected from the group consisting of the alkali metal and ammonium salts.

2. A latex according to claim 1 in which said extract is obtained from the plant *Grindelia squarrosa*.

3. A latex according to claim 1 in which the polymer is a styrene-butadiene polymer.

4. A freeze-stable water dispersion paint composition comprising a synthetic polymer latex prepared by emulsion polymerization, a paint pigment and as a freeze-stabilizing agent about 0.5–15% by weight of the polymer content of the latex of a hydrocarbon insoluble-alcohol soluble extract of the plant Grindelia obtained by extracting said plant with a hydrocarbon and then extracting the resulting hydrocarbon insoluble residue with an alcohol, said hydrocarbon insoluble-alcohol soluble extract being in the form of a salt selected from the group consisting of the alkali metal and ammonium salts.

5. A composition according to claim 4 in which said extract is obtained from the plant *Grindelia squarrosa*.

6. A composition according to claim 4 in which the polymer is a butadiene-styrene polymer.

References Cited in the file of this patent

UNITED STATES PATENTS

| | | |
| --- | --- | --- |
| 2,384,910 | Hanson et al. | Sept. 18, 1945 |
| 2,444,396 | Collins et al. | June 29, 1948 |
| 2,556,575 | Cubberley et al. | June 12, 1951 |
| 2,822,341 | Miller et al. | Feb. 4, 1958 |
| 2,868,741 | Chambers et al. | Jan. 13, 1959 |
| 2,956,973 | Holdsworth | Oct. 18, 1960 |

OTHER REFERENCES

Martin et al.: Jour. of Agricultural Research, vol. 42, No. 2, Jan. 15, 1931, pp. 57–69.